United States Patent
Suzuki et al.

(10) Patent No.: US 10,272,776 B2
(45) Date of Patent: Apr. 30, 2019

(54) FOUR-WHEEL DRIVE VEHICLE

(71) Applicant: JTEKT CORPORATION, Osaka-shi (JP)

(72) Inventors: Yoshinori Suzuki, Okazaki (JP); Yasufumi Nakamura, Anjo (JP); Kaori Fujita, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 171 days.

(21) Appl. No.: 15/383,347

(22) Filed: Dec. 19, 2016

(65) Prior Publication Data

US 2017/0182885 A1 Jun. 29, 2017

(30) Foreign Application Priority Data

Dec. 25, 2015 (JP) ................... 2015-254501

(51) Int. Cl.
| | | |
|---|---|---|
| B62K 23/08 | (2006.01) | |
| B60K 17/34 | (2006.01) | |
| B60K 17/16 | (2006.01) | |
| B60K 23/04 | (2006.01) | |
| B60K 23/08 | (2006.01) | |

(52) U.S. Cl.
CPC ............ B60K 17/34 (2013.01); B60K 17/165 (2013.01); B60K 23/04 (2013.01); B60K 23/08 (2013.01); *B60K 2023/0833* (2013.01); *B60Y 2400/405* (2013.01); *B60Y 2400/406* (2013.01); *B60Y 2400/422* (2013.01); *B60Y 2400/424* (2013.01)

(58) Field of Classification Search
None
See application file for complete search history.

(56) References Cited

U.S. PATENT DOCUMENTS

| | | | | |
|---|---|---|---|---|
| 4,771,852 | A | * 9/1988 | Nishikawa | ............ B60K 23/08 180/247 |
| 5,813,490 | A | * 9/1998 | Takasaki | ............ B60K 23/0808 180/250 |
| 2014/0135168 | A1 | * 5/2014 | Yokoo | ...................... B60K 6/52 477/8 |
| 2017/0253119 | A1 | * 9/2017 | Suwabe | ................ B60W 10/06 |
| 2018/0037110 | A1 | * 2/2018 | Yoshida | ............... B60K 17/348 |
| 2018/0093566 | A1 | * 4/2018 | Kondo | ................. B60W 30/02 |

FOREIGN PATENT DOCUMENTS

JP  2014-231858  12/2014

* cited by examiner

*Primary Examiner* — Tony H Winner
(74) *Attorney, Agent, or Firm* — Oblon, McClelland, Maier & Neustadt, L.L.P.

(57) ABSTRACT

A four-wheel drive vehicle includes a friction clutch that transmits a driving force to rear wheels, a hydraulic circuit including a control valve that reduces a pressure of hydraulic oil discharged from a hydraulic pump down to a control pressure corresponding to a control current, and the cylinder and a piston that receives the oil from hydraulic circuit the to press the friction clutch. In the hydraulic circuit, a ratio of an change amount in a feeding pressure to the cylinder to an change amount in the control current, when the feeding pressure to the cylinder is lower than a predetermined value, is lower than when the feeding pressure applied to the cylinder is equal to or higher than the predetermined value. The control apparatus controls a pressure of the hydraulic oil fed to the cylinder lower than the predetermined value when switching the driving state.

5 Claims, 11 Drawing Sheets

(FIRST EMBODIMENT)

(FIRST EMBODIMENT)

(FIRST EMBODIMENT)

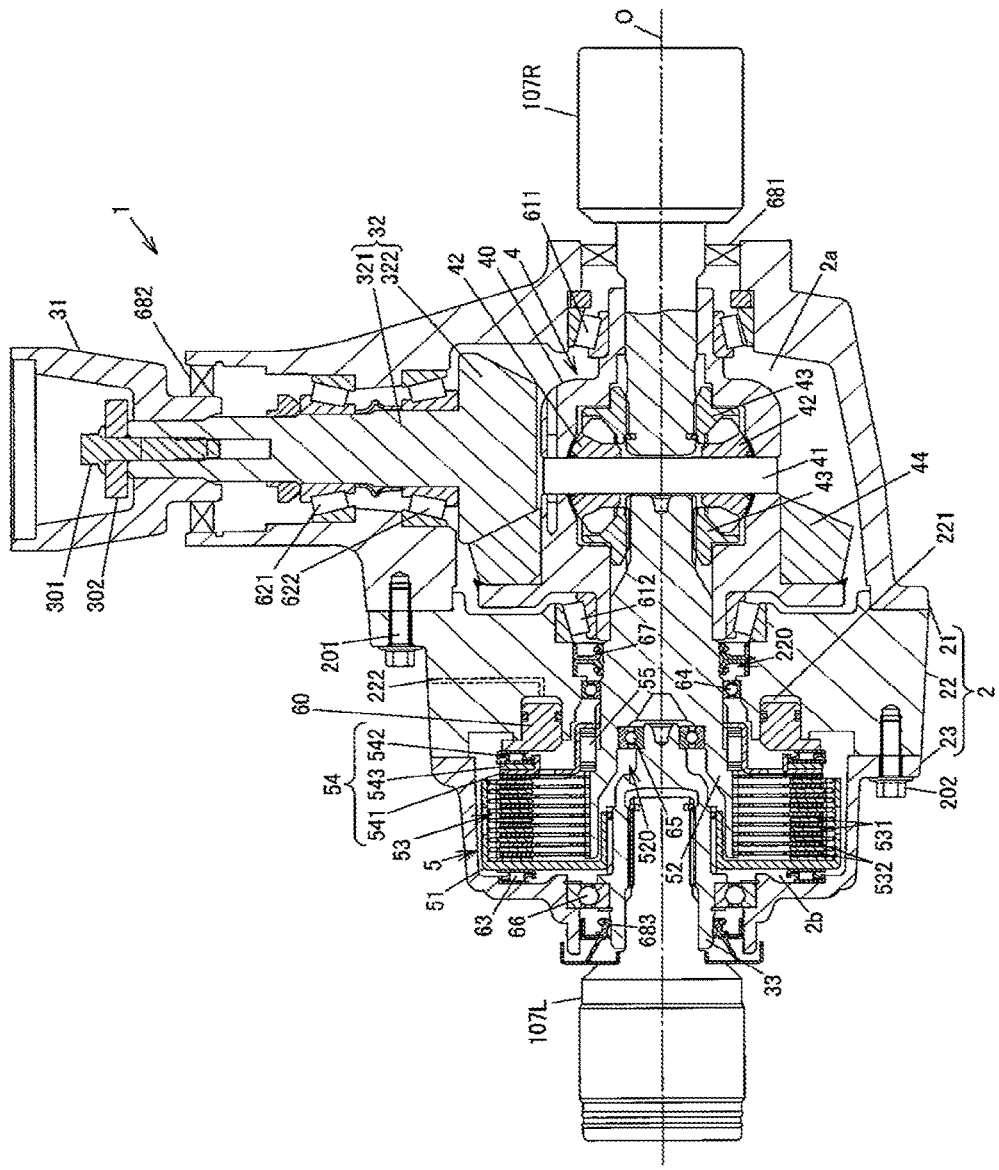
FIG.3 (FIRST EMBODIMENT)

(FIRST EMBODIMENT)

FIG.5 (FIRST EMBODIMENT)
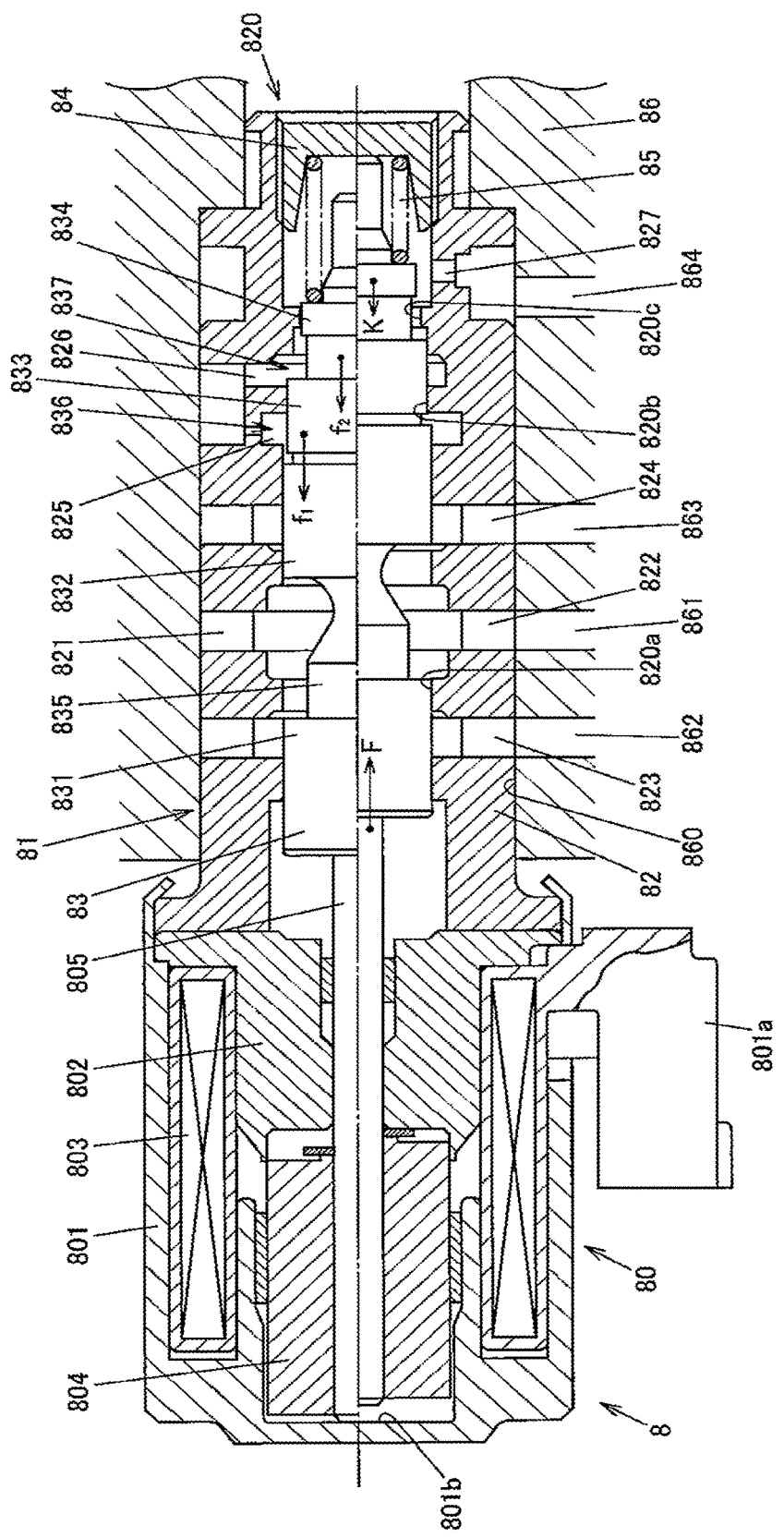

FIG.6 (FIRST EMBODIMENT)
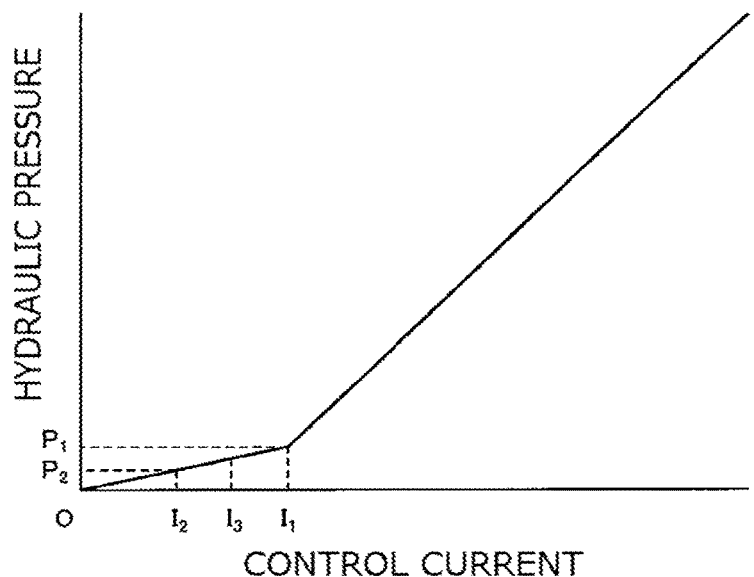
FIG.7 (SECOND EMBODIMENT)
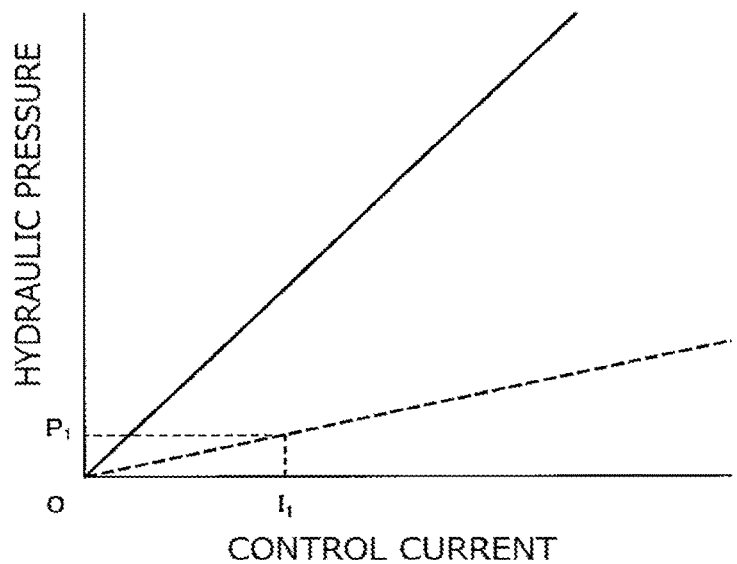

(THIRD EMBODIMENT)

(THIRD EMBODIMENT)

(FOURTH EMBODIMENT)

(FIFTH EMBODIMENT)

FOUR-WHEEL DRIVE VEHICLE

INCORPORATION BY REFERENCE

The disclosure of Japanese Patent Application No. 2015-254501 filed on Dec. 25, 2015 including the specification, drawings and abstract, is incorporated herein by reference in its entirety.

BACKGROUND OF THE INVENTION

1. Field of the Invention

The invention relates to a four-wheel drive vehicle that enables switching between a two-wheel driving state and a four-wheel driving state.

2. Description of the Related Art

Four-wheel drive vehicles have been available which include a lateral pair of main driving wheels and a lateral pair of auxiliary driving wheels and in which a driving force of a driving source is constantly transmitted to the main driving wheels, whereas the driving force of the driving source is transmitted to the auxiliary driving wheels only during four-wheel driving. In some of the four-wheel drive vehicles, the auxiliary driving wheels are driven by a driving force (torque) transmitted via a friction clutch that is hydraulically pressed (see, for example, Japanese Patent Application Publication No. 2014-231858 (JP 2014-231858 A)).

A four-wheel drive vehicle described in JP 2014-231858 A includes a driving force distribution apparatus that distributes the driving force between the right and left auxiliary driving wheels while permitting differential motion. The driving force distribution apparatus includes a pump that discharges hydraulic oil, a control valve having an opening varied according to the amperage of a supplied current, a piston housed in a cylinder to which the hydraulic oil with the pressure thereof adjusted by the control valve is supplied, and the friction clutch pressed by the piston. In the friction clutch, a plurality of clutch plates are brought into frictional contact with one another by a pressing force applied by the piston, to transmit a torque corresponding to the pressing force.

A four-wheel driving vehicle described in JP 2014-231858 A includes a jaw clutch (positive clutch) that enables interruption of transmission of the driving force from the driving source to a propeller shaft that transmits the driving force in a front-rear direction of the vehicle. During two-wheel driving, the transmission of the driving force via the jaw clutch is interrupted, and the friction clutch of the driving force distribution apparatus is disengaged. Consequently, even during traveling, the propeller shaft stops rotating to reduce resistance to stirring of lubricant in gear mechanisms provided at opposite ends of the propeller shaft.

When the four-wheel drive vehicle configured as described above shifts from the two-wheel driving state to the four-wheel driving state, the friction clutch of the driving force distribution apparatus is pressed by a relatively weak pressing force to transmit a torque from the auxiliary driving wheels to the propeller shaft via the friction clutch, rotating the propeller shaft, and rotational synchronization is performed at the jaw clutch, which is then engaged. When the four-wheel drive vehicle shifts from the four-wheel driving state to the two-wheel driving state, the friction clutch of the driving force distribution apparatus is pressed by a relatively weak pressing force to set the jaw clutch to an interruption state with vibration of the propeller shaft suppressed. Subsequently, the friction clutch is disengaged.

In this case, when the pressing force applied to the friction clutch is not precisely controlled, the propeller shaft fails to be appropriately accelerated when the two-wheel driving state is switched to the four-wheel driving state or vibration of the propeller shaft fails to be appropriately suppressed when the four-wheel driving state is switched to the two-wheel driving state. Thus, switching of the driving state may take a long time or possible vibration or noise may make an occupant uneasy and uncomfortable. Therefore, a four-wheel driving vehicle has been demanded which enables the torque transmitted via the friction clutch for transmitting the driving force to the auxiliary driving wheels to be precisely controlled particularly in a low torque region.

SUMMARY OF THE INVENTION

An object of the invention is to provide a four-wheel driving vehicle that enables a torque transmitted via a friction clutch for transmitting a driving force to auxiliary driving wheels to be precisely controlled particularly in a low torque region.

A four-wheel drive vehicle in an aspect of the invention enables switching between a two-wheel driving state and a four-wheel driving state. The four-wheel drive vehicle includes a driving source that generates a driving force, main driving wheels to which the driving force is transmitted in the two-wheel driving state and in the four-wheel driving state, auxiliary driving wheels to which the driving force is transmitted in the four-wheel driving state, a driving shaft through which the driving force is transmitted to the auxiliary driving wheels, an interrupting mechanism that enables interruption of transmission of the driving force from the driving source to the driving shaft, a driving force distribution apparatus that distributes the driving force transmitted through the driving shaft between the auxiliary driving wheels, and a control apparatus that controls the interrupting mechanism and the driving force distribution apparatus to enable the driving force to be transmitted to the auxiliary driving wheels in the four-wheel driving state and to interrupt transmission of the driving force by the interrupting mechanism and the driving force distribution apparatus. The driving force distribution apparatus includes a friction clutch having a first friction disc that rotates along with an output rotating member on an auxiliary driving wheel side and a second friction disc that rotates along with an input rotating member on a driving shaft side, a piston that receives a hydraulic pressure of hydraulic oil fed to a cylinder to press the friction clutch, a hydraulic pump that discharges the hydraulic oil, and a hydraulic circuit including a control valve that reduces the pressure of the hydraulic oil discharged from the hydraulic pump down to a control pressure corresponding to a control current to output a resultant pressure, the hydraulic circuit feeding the hydraulic oil with the reduced pressure to the cylinder. In the hydraulic circuit, a change ratio being a ratio of an amount of change in a feeding pressure applied to the cylinder to an amount of change in the control current, when the pressure of the hydraulic oil fed to the cylinder is lower than a predetermined value, is lower than the change ratio when the pressure of the hydraulic oil fed to the cylinder is equal to or higher than the predetermined value. The control apparatus adjusts the control current so as to feed the hydraulic oil with a pressure lower than the predetermined value to the cylinder at least either when switching from the two-wheel driving state to the four-wheel driving state or when switching from the four-wheel driving state to the two-wheel driving state.

The four-wheel drive vehicle in this aspect enables a torque transmitted via a friction clutch for transmitting a driving force to auxiliary driving wheels to be precisely controlled particularly in a low torque region.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a sectional view depicting a configuration example of the driving force distribution apparatus;

FIG. 5 is a sectional view depicting a configuration example of a control valve;

FIG. 6 is a graph illustrating current-hydraulic pressure characteristics indicative of a relation between a control current supplied to the control valve and a hydraulic pressure output from the control valve;

FIG. 7 is a graph illustrating the current-hydraulic pressure characteristics of the control valve according to a second embodiment;

DETAILED DESCRIPTION OF EMBODIMENTS

A first embodiment of the invention will be described with reference to FIGS. 1 to 6.

Figure 1:
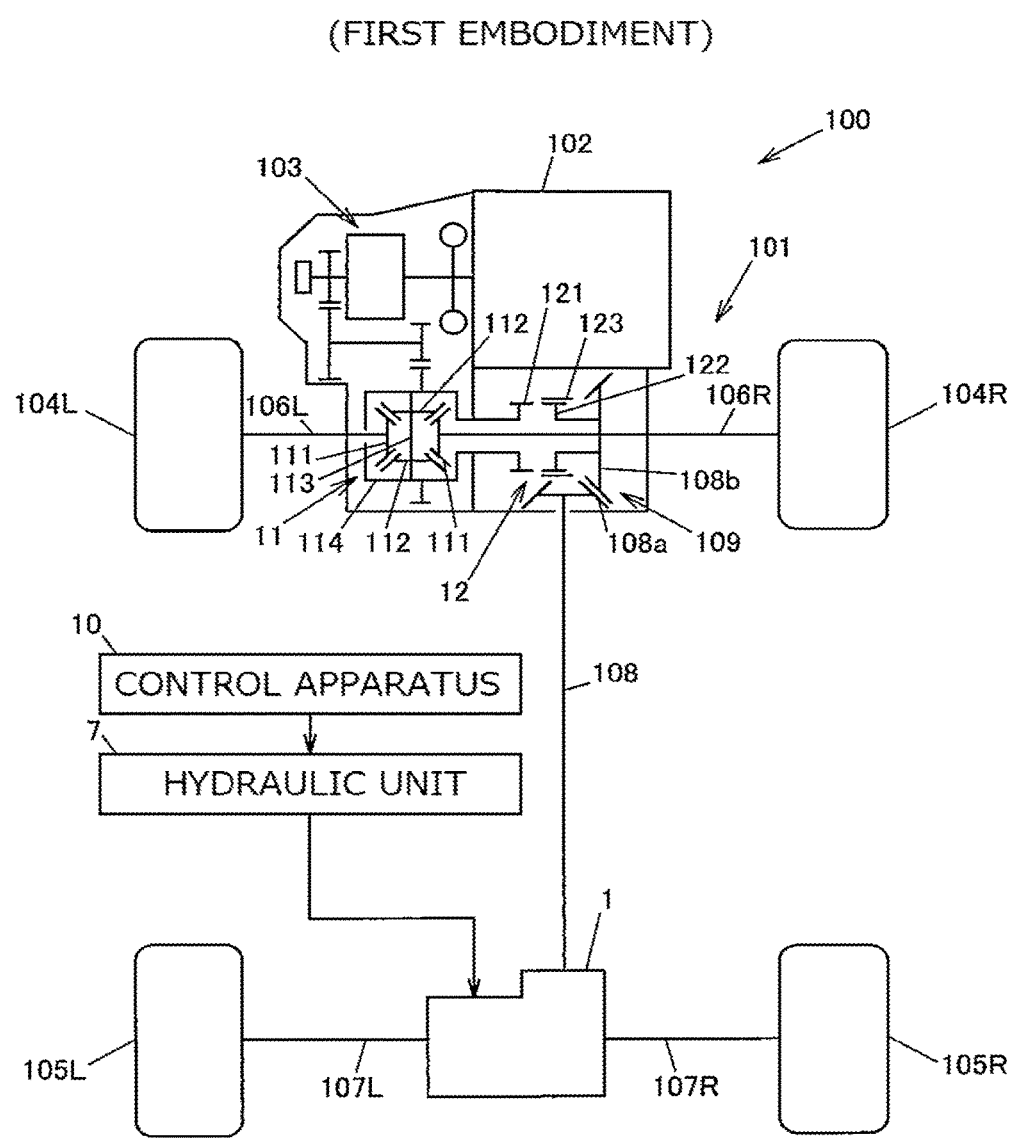
FIG. 1 is a diagram depicting a configuration example of a four-wheel drive vehicle equipped with a driving force distribution apparatus according to a first embodiment of the invention.

FIG. 1 is a diagram depicting a configuration example of a four-wheel drive vehicle equipped with a driving force distribution apparatus according to a first embodiment of the invention.

A four-wheel drive vehicle 100 includes an engine 102 serving as a driving source that generates a driving force for traveling, a transmission 103, front wheels 104R, 104L serving as a lateral pair of main driving wheels, rear wheels 105R and 105L serving as a lateral pair of auxiliary driving wheels, a driving force transmission system 101 that enables the driving force of the engine 102 to be transmitted to the front wheels 104R, 104L and the rear wheels 105R, 105L, a control apparatus 10, and a hydraulic unit 7. In the embodiments, R and L in reference numerals are used to mean right and left, respectively, with respect to a forward direction of a vehicle.

The four-wheel drive vehicle 100 enables switching between a four-wheel driving state where the driving force of the engine 102 is transmitted to the front wheels 104R, 104L and the rear wheels 105R, 105L and a two-wheel driving state where the driving force of the engine 102 is transmitted only to the front wheels 104R, 104L. In the description of the embodiments, an engine that is an internal combustion engine is applied as the driving source. However, the invention is not limited to this. The driving source may include a combination of an engine and a high-output electric motor such as an interior permanent magnet synchronous (IPM) motor, or only the high-output electric motor.

A driving force transmission system 101 has front-wheel drive shafts 106R, 106L, rear-wheel drive shafts 107R, 107L, a propeller shaft 108 extending in a front-rear direction of the vehicle to transmit the driving force to the rear wheels 105R, 105L, a front differential 11, an interrupting mechanism 12 that enables interruption of transmission of the driving force from the engine 102 to the propeller shaft 108, and a driving force distribution apparatus 1 that distributes the driving force transmitted through the propeller shaft 108 between the rear wheels 105R, 105L while permitting differential motion.

The driving force of the engine 102 is constantly transmitted to the front wheels 104R, 104L. The driving force of the engine 102 is transmitted to the rear wheels 105R, 105L via the interrupting mechanism 12, the propeller shaft 108, and the driving force distribution apparatus 1.

A front differential 11 has a pair of side gears 111, 111 coupled to the front-wheel drive shafts 106R, 106L, a pair of pinion gears 112, 112 meshing with the side gears 111, 111 with gear axes of the pinion gears 112, 112 orthogonal to those of the side gears 111, 111, a pinion shaft 113 that supports the pinion gears 112, 112, and a front differential case 114 in which the side gears 111, 111, the pinion gears 112, 112, and the pinion shaft 113 are housed.

The interrupting mechanism 12 has a first clutch wheel 121 that rotates integrally with the front differential case 114, a second clutch wheel 122 located adjacent to the first clutch wheel 121 in an axial direction, and a cylindrical sleeve 123 that enables the first clutch wheel 121 and the second clutch wheel 122 to be coupled together so as to inhibit the first clutch wheel 121 and the second clutch wheel 122 from rotating relative to each other. The sleeve 123 can be moved forward and backward in the axial direction by an actuator, and moves forward and backward to switch between a coupling state where the first clutch wheel 121 and the second clutch wheel 122 are coupled together via the sleeve 123 so as to rotate integrally and an uncoupling state where the first clutch wheel 121 and the second clutch wheel 122 can rotate relative to each other. A configuration of the interrupting mechanism 12 will be described below in detail.

The propeller shaft 108 receives the driving force of the engine 102 from a front differential case 114 via the interrupting mechanism 12 to transmit the driving force to the driving force distribution apparatus 1. At front-wheel end of the propeller shaft 108, a pinion gear 108a is provided which meshes with a ring gear 108b coupled to the second clutch wheel 122 of the interrupting mechanism 12 so as to be inhibited from rotating relative to the second clutch wheel 122. The ring gear 108*b* and the pinion gear 108*a* are hypoid gears and are included in a gear mechanism 109.

In the four-wheel driving state of the four-wheel drive vehicle 100, the interrupting mechanism 12 is set to the coupling state to transmit the driving force of the engine 102 to the rear wheels 105R, 105L via the driving force distribution apparatus 1. In the two-wheel driving state, the interrupting mechanism 12 is set to the uncoupling state to interrupt transmission of the driving force of the engine 102 to the propeller shaft 108.

In the four-wheel driving state, the driving force distribution apparatus 1 distributes the driving force that is input through the propeller shaft 108 to the rear wheels 105R, 105L while permitting differential motion. The drive shaft 107L is coupled to the left rear wheel 105L, and the drive shaft 107R is coupled to the right rear wheel 105R.

The hydraulic unit 7 is controlled, for example, by the control apparatus 10 based on a signal from a driving state switch operated by a driver, to feed the hydraulic oil to the driving force distribution apparatus 1. The driving force distribution apparatus 1 is actuated by the pressure of the hydraulic oil to transmit the driving force to the rear-wheel drive shafts 107R, 107L through the propeller shaft 108.

Figure 2A:
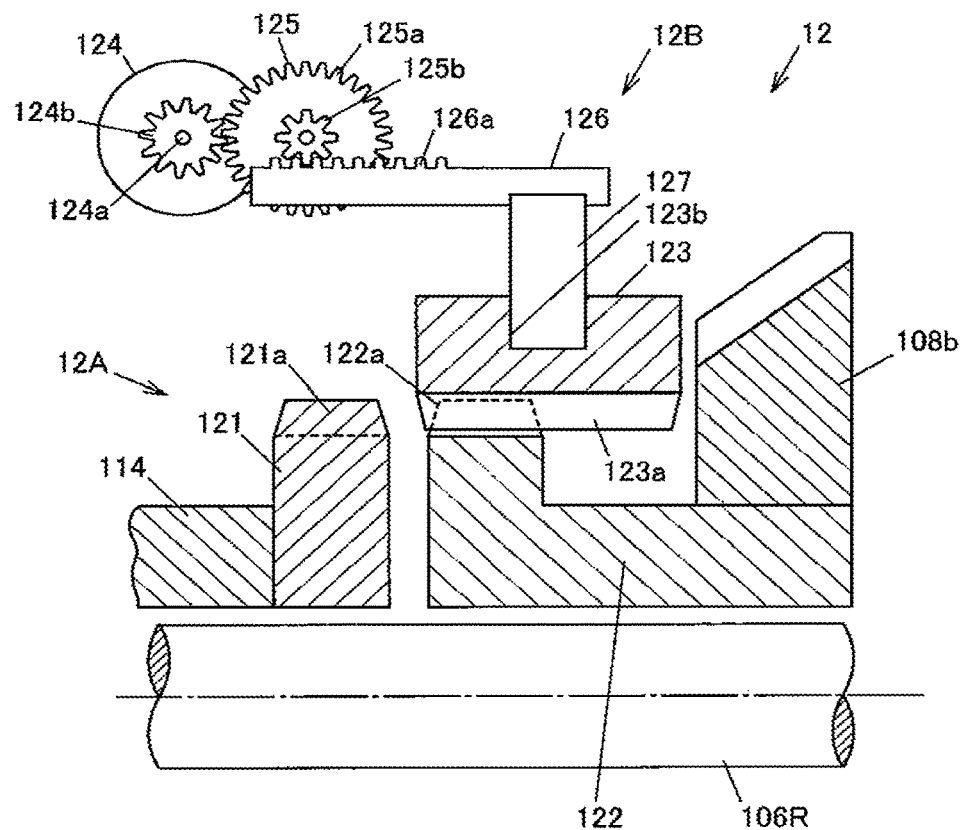
FIG. 2A is a sectional view of a configuration example of an interrupting mechanism.
Figure 2B:
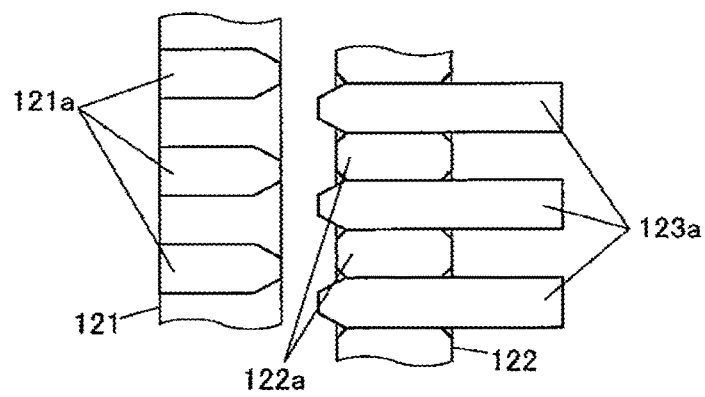
FIG. 2B is a diagram illustrating a meshing portion in the configuration example of the interrupting mechanism.

FIG. 2A is a sectional view of a configuration example of the interrupting mechanism 12. FIG. 2B is a diagram illustrating a meshing portion of the interrupting mechanism 12. FIG. 2A illustrates an upper half of the interrupting mechanism 12 above a rotation axis of the front differential case 114.

The interrupting mechanism 12 includes a positive clutch 12A including the first clutch wheel 121, the second clutch wheel 122, and the sleeve 123, and an actuator 12B that actuates the positive clutch 12A.

The first clutch wheel 121 is annular such that the right front-wheel drive shaft 106R is inserted through an inner peripheral side of the first clutch wheel 121, and has a plurality of spline teeth 121*a* on an outer peripheral surface of the first clutch wheel 121. The second clutch wheel 122 is tubular such that the right front-wheel drive shaft 106R is inserted through an inner peripheral side of the second clutch wheel 122, and can rotate relative to and coaxially with the first clutch wheel 121. The second clutch wheel 122 has a plurality of spline teeth 122*a* formed on an outer peripheral surface of the second clutch wheel 122 so as to extend parallel to the rotation axis of the front differential case 114.

The sleeve 123 is a tubular coupling member arranged on an outer peripheral side of the first clutch wheel 121 and the second clutch wheel 122. On an inner peripheral surface of the sleeve 123, a plurality of spline teeth 123*a* that can engage with the spline teeth 121*a* of the first clutch wheel 121 and the spline teeth 122*a* of the second clutch wheel 122 is formed.

In the present embodiment, the sleeve 123 constantly meshes with the second clutch wheel 122 and is movable in the axial direction with respect to the second clutch wheel 122. More specifically, the spline teeth 123*a* of the sleeve 123 mesh with the spline teeth 122*a* of the second clutch wheel 122, and with the meshing engagement maintained, the sleeve 123 is movable in the axial direction with respect to the second clutch wheel 122. When the sleeve 123 is moved toward the first clutch wheel 121 by the actuator 12B, the spline teeth 123*a* of the sleeve 123 come into meshing engagement with the spline teeth 121*a* of the first clutch wheel 121 to couple the sleeve 123 to the first clutch wheel 121 so as to inhibit the sleeve 123 from rotating relative to the first clutch wheel 121.

The actuator 12B has an electric motor 124, a pinion 125, a rack shaft 126, and a shifting fork 127. The control apparatus 10 supplies a current to the electric motor 124. The pinion 125 has a large-diameter tooth portion 125*a* and a small-diameter tooth portion 125*b*. The large-diameter tooth portion 125*a* is in meshing engagement with an output gear 124*b* fixed to a shaft 124*a* of the electric motor 124. The small-diameter tooth portion 125*b* is in meshing engagement with rack teeth 126*a* of the rack shaft 126. The shifting fork 127 is fixed to the rack shaft 126 and is in engagement with a peripheral groove 123*b* formed in the sleeve 123. The sleeve 123 can rotate while remaining engaged with the shifting fork 127.

When the electric motor 124 rotates, the speed of the rotation is reduced by the pinion 125, and the rotation with the reduced speed is transmitted to the rack shaft. Then, the rack shaft 126 moves in an axial direction of the first clutch wheel 121 and the second clutch wheel 122. The shifting fork 127 moves along with the rack shaft 126. In conjunction with the movement, the sleeve 123 correspondingly moves forward and backward in the axial direction with respect to the first clutch wheel 121 and the second clutch wheel 122. This allows switching between the coupling state where the first clutch wheel 121 and the second clutch wheel 122 are coupled together via the sleeve 123 so as to rotate integrally and the uncoupling state where the first clutch wheel 121 and the second clutch wheel 122 are rotatable relative to each other.

FIG. 3 is a sectional view depicting a configuration example of the driving force distribution apparatus 1 in horizontal cross section.

As depicted FIG. 3, the driving force distribution apparatus 1 includes a housing 2 including a first to a third housing members 21 to 23, a coupling member 31 to which the propeller shaft 108 is coupled, a pinion gear shaft 32 that rotates integrally with the coupling member 31, a differential mechanism 4 that distributes, in the four-wheel driving state, the driving force of the engine 102 transmitted via the propeller shaft 108 between the right and left rear wheels 105R, 105L while permitting differential motion, a clutch mechanism 5 that enables adjustment of the driving force transmitted from the differential mechanism 4 to the rear wheel 105L, and a piston 60 that is operated by the pressure of the hydraulic oil fed from the hydraulic unit 7 (depicted in FIG. 1).

The clutch mechanism 5 has a friction clutch 53 that is pressed by the piston 60, and is arranged between the drive shaft 107L and the differential mechanism 4. The second housing member 22 is provided with an annular cylinder 221 to which the hydraulic oil from the hydraulic unit 7 is fed and a hydraulic oil feeding hole 222 that communicates with the cylinder 221. One end of the piston 60 is housed in the cylinder 221. In FIG. 3, the hydraulic oil feeding hole 222 is depicted by a dashed line.

The differential mechanism 4 has a differential case 40, a pinion shaft 41 supported by the differential case 40, a pair of pinion gears 42, 42 supported by the pinion shaft 41, a pair of side gears 43, 43 that meshes with the pinion gears 42, 42 with gear axes of the side gears 43, 43 orthogonal to those of the pinion gears 42, 42, and a ring gear 44 that rotates with the differential case 40. The differential case 40 is rotatably supported by tapered roller bearings 611, 612 at opposite ends of the differential case 40 in a vehicle width direction, and rotates integrally with the pinion shaft 41 around the rotation axis O.

For the side gears 43, 43 of the differential mechanism 4, a coupling shaft 33 is arranged coaxially with the first side gear 43 via the clutch mechanism 5, and the drive shaft 107R is coupled to the second side gear 43 so as to be inhibited from rotating relative to the second side gear 43. The drive shaft 107L is coupled to the coupling shaft so as to be inhibited from rotating relative to the coupling shaft 33. FIG. 3 depicts outer races of constant-velocity universal joints arranged at ends of the rear-wheel drive shafts 107R, 107L.

The coupling member 31 and the pinion gear shaft 32 are coupled together via a bolt 301 and a washer 302. The pinion gear shaft 32 has a shaft portion 321 and a gear portion 322, and the shaft portion is rotatably supported by a pair of tapered roller bearings 621, 622. The gear portion 322 is in meshing engagement with the ring gear 44 of the differential mechanism 4.

The clutch mechanism 5 is arranged between the first side gear 43 and the coupling shaft 33 to transmit the driving force from the first side gear 43 to the coupling shaft 33 via the friction clutch 53. In the four-wheel driving state of the four-wheel drive vehicle 100, when the clutch mechanism 5 adjusts the driving force transmitted from the first side gear 43 to the drive shaft 107L via the coupling shaft 33, a driving force comparable to the driving force transmitted to the drive shaft 107L is also transmitted to the drive shaft 107R.

The housing 2 has the first housing member 21 that houses the pinion gear shaft 32 and the differential mechanism 4, the second housing member 22 coupled to the first housing member 21 with a plurality of bolts 201, and the third housing member 23 coupled to the second housing member 22 with a plurality of bolts 202. FIG. 3 depicts one of the bolts 201 and one of the bolts 202.

The housing 2 includes a first housing chamber 2a that houses the differential mechanism 4 and a second housing chamber 2b that houses the clutch mechanism 5, and the first housing chamber 2a and the second housing chamber 2b are defined by a seal member 67 fixed to an inner surface of a shaft hole 220 formed in a central portion of the second housing member 22. A lubricant (gear oil) with a viscosity suitable for lubricating the gears is sealed in the first housing member 2a.

A lubricant (clutch oil) with a relatively low viscosity is sealed in the second housing chamber 2b to smooth frictional sliding between a plurality of outer clutch plates 531 and a plurality of inner clutch plates 532 included in the friction clutch 53 of the clutch mechanism 5. The lubricants restrain the outer clutch plates 531 and the inner clutch plates 532 from being worn or seized.

In the first housing member 21, a seal member 681 is fitted to an inner surface of an insertion hole through which the drive shaft 107R is inserted, and a seal member 682 is fitted to an inner surface of an insertion hole through which the coupling member 31 and the pinion gear shaft 32 are inserted. In the third housing member 23, a seal member 683 is fitted to an inner surface of an insertion hole through which the coupling shaft 33 is inserted.

The clutch mechanism 5 has a clutch drum 51 that rotates integrally with the coupling shaft 33, a shaft-like inner shaft 52 that rotates integrally with the first side gear 43 of the differential mechanism 4, the friction clutch 53 that transmits the driving force between the clutch drum 51, serving as an output rotating member, and the inner shaft 52, serving as an input rotating member, and a pressing force transmission mechanism 54 that transmits a pressing force of the piston 60 to the friction clutch 53.

The friction clutch 53 has the outer clutch plates 531, which rotate along with the clutch drum 51 and serve as a plurality of first friction discs, and the inner clutch plates 532, which rotate along with the inner shaft 52 and serve as a plurality of second friction discs. In the present embodiment, the friction clutch 53 has nine outer clutch plates 531 and also nine inner clutch plates 532, and the outer clutch plates 531 and the inner clutch plates 532 are alternately arranged along the axial direction.

Each of the outer clutch plates 531 has a plurality of protrusions located at an outer peripheral end of the outer clutch plate 531 and spline-engaged with an inner peripheral surface of the clutch drum 51. The outer clutch plates 531 are coupled to the clutch drum 51 so as to be movable in the axial direction with respect to the clutch drum 51 and to be inhibited from rotating relative to the clutch drum 51. Each of the inner clutch plates 532 has a plurality of protrusions located at an inner peripheral end of the inner clutch plate 532 and spline-engaged with an outer peripheral surface of the inner shaft 52. The inner clutch plates 532 are coupled to the inner shaft 52 so as to be movable in the axial direction with respect to the inner shaft 52 and to be inhibited from rotating relative to the inner shaft 52.

The friction clutch 53 receives the pressing force of the piston 60 via the pressing force transmission mechanism 54 to exert a friction force between the outer clutch plates 531 and the inner clutch plates 532. The friction force allows the driving force to be transmitted. The pressing force transmission mechanism 54 has an annular slide member 541 coupled to the inner shaft 52 in the axial direction so as to be inhibited from rotating relative to the inner shaft 52, a thrust needle roller bearing 542, and a shim 543 that adjusts the position of the pressing force transmission mechanism 54 in the direction of the rotation axis O.

The slide member 541 is biased in a direction away from the friction clutch 53 by a bias member 55. The bias member 55 is an elastic body, for example, a spring and is in abutting contact, at one end of the bias member 55, with a stepped surface formed on the inner shaft 52 and, at the other end of the bias member, with an inner flange portion of the slide member 541.

A thrust roller bearing 63 is arranged between the clutch drum 51 and an inner surface of the third housing member 23 to regulate axial movement of the clutch drum 51. The inner shaft 52 is rotatably supported by a ball bearing 64 fixed to the inner surface of the shaft hole 220. A housing hole 520 is formed in a central portion of the inner shaft 52 such that one end of the coupling shaft 33 may be housed in the housing hole 520. The coupling shaft 33 is rotatably supported by a ball bearing 65 arranged between the coupling shaft 33 and an inner surface of the housing hole 520 and by a ball bearing 66 arranged between the coupling shaft 33 and the third housing member 23.

The hydraulic oil is fed from the hydraulic unit 7 to the cylinder 221 via the hydraulic oil feeding hole 222. The piston 60 receives the hydraulic pressure of the hydraulic oil fed to the cylinder 221 to press the friction clutch 53. Consequently, a friction force is exerted between the outer clutch plates 531 and the inner clutch plates 532 to transmit the driving force from the inner shaft 52 to the clutch drum 51. The driving force is further transmitted to the drive shaft 107L via the coupling shaft 33. A driving force comparable to the driving force transmitted to the drive shaft 107L is also transmitted to the drive shaft 107R via the differential mechanism 4.

Figure 4:
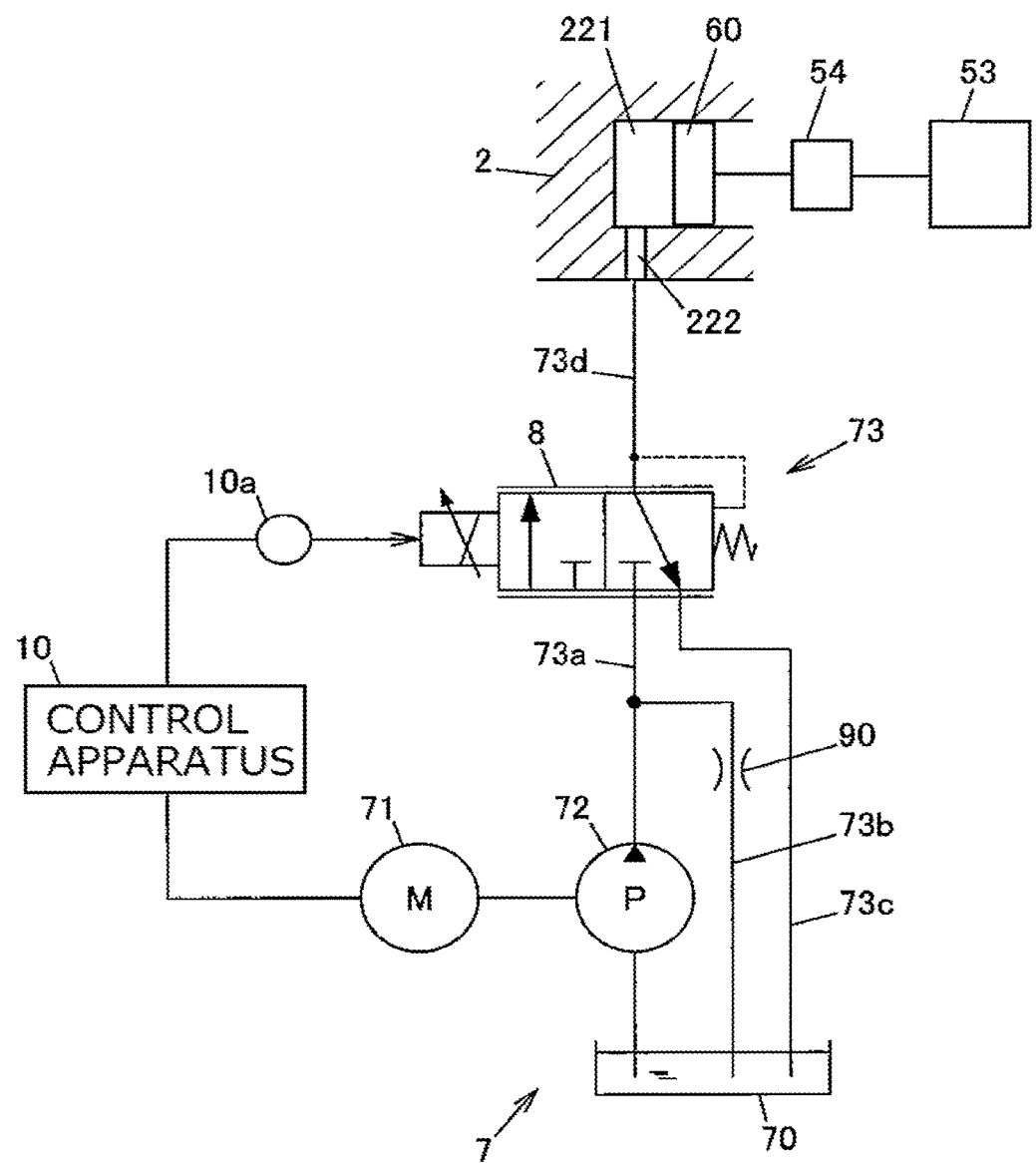
FIG. 4 is a schematic diagram depicting a configuration example of a hydraulic unit.

FIG. 4 is a schematic diagram depicting a configuration example of the hydraulic unit 7.

The hydraulic unit 7 includes a reservoir 70, an electric motor 71 to which the control apparatus 10 supplies a current, a hydraulic pump 72 that is driven by the electric motor 71 to suck the hydraulic oil from the reservoir 70 and to discharge the hydraulic oil, and a hydraulic circuit 73. The electric motor 71 is, for example, a DC motor. The hydraulic pump 72 is, for example, a gear pump or a vane pump.

The hydraulic circuit 73 has a control valve 8, a fixed restrictor 90, a pipeline 73*a* extending from the hydraulic pump 72 to the control valve 8, a pipeline 73*b* branching off from the pipeline 73*a* to extend to the reservoir 70 via the fixed restrictor 90, a pipeline 73*c* extending from the control valve 8 to the reservoir 70, and a pipeline 73*d* extending from the control valve 8 to the hydraulic oil feeding hole 222 in the housing 2.

The hydraulic circuit 73 feeds the hydraulic oil with the pressure thereof reduced by the control valve 8 to the cylinder 221 via the hydraulic oil feeding hole 222. The control valve 8 reduces the pressure of the hydraulic oil discharged from the hydraulic pump 72 down to a control pressure corresponding to a control current supplied by the control apparatus 10, to output the resultant hydraulic oil to the pipeline 73*d*. The fixed restrictor 90 returns excess hydraulic oil to the reservoir 70. The hydraulic oil with a given pressure corresponding to the opening of the fixed restrictor 90 is fed to the control valve 8.

FIG. 5 is a sectional view depicting a configuration example of the control valve 8. FIG. 6 is a graph illustrating current-hydraulic pressure characteristics indicative of a relation between the control current supplied to the control valve 8 and the hydraulic pressure output from the control valve 8.

Two-stage changes are exhibited by the current-hydraulic pressure characteristics of the control valve 8, which are indicative of the relation between the supplied control current and the output hydraulic pressure (control pressure). Specifically, when the control current is smaller than a predetermined current value $I_1$, a change ratio of an output hydraulic pressure to the control current is low, and when the control current is equal to or larger than the predetermined current value $I_1$, the change ratio of the output hydraulic pressure to the control current is high, as illustrated in FIG. 6. In other words, the ratio of the amount of change in a feeding pressure applied to the cylinder 221 to the amount of change in control current, when the pressure of the hydraulic oil fed to the cylinder 221 is lower than a predetermined pressure value $P_1$ corresponding to the predetermined current value $I_1$, is lower than the ratio than when the pressure of the hydraulic oil fed to the cylinder 221 is equal to or higher than the predetermined pressure value $P_1$. A region where the control current is smaller than the predetermined current value $I_1$ is hereinafter referred to as a first region of the current-hydraulic pressure characteristics, and a region where the control current is equal to or larger than the predetermined current value $I_1$ is hereinafter referred to as a second region of the current-hydraulic pressure characteristics.

As depicted in FIG. 5, the control valve 8 has a solenoid unit portion 80 and a spool valve portion 81. The solenoid unit portion 80 has a cover 801, a yoke 802, a solenoid coil 803, a plunger 804, and a shaft 805 fixed to the plunger 804. The cover 801, the yoke 802, and the plunger 804 are formed of a soft magnetic material.

The cover 801 is provided with a connector portion 801*a*. The control current from the control apparatus 10 is supplied to the solenoid coil 803 via the connector portion 801*a*. The solenoid coil 803 is held by the cover 801. A current sensor 10*a* (see FIG. 4) detects the current value of the control current supplied to the solenoid coil 803 by the control apparatus 10, and a resultant detection signal is fed back to the control apparatus 10. The plunger 804 is moved in the axial direction along with the shaft 805 by a magnetic flux generated in the cover 801 and the yoke 802 as a result of conduction of a current through the solenoid coil 803.

The spool valve portion 81 has a tubular sleeve 82 and a spool 83 housed in a valve hole 820 in the sleeve 82 so as to be movable in the axial direction. The sleeve 82 is fixed to the yoke 802 by clinching the cover 801. One end of the shaft 805 is in abutting contact with the spool 83.

The valve hole 820 in the sleeve 82 has a first to a third valve holes 820*a* to 820*c* with different bore diameters. The second valve hole 820*b* has a larger bore diameter than the third valve hole 820*c*, and the first valve hole 820*a* has a larger diameter than the second valve hole 820*b*. The sleeve 82 has a plug 84 screw-threaded at an end of the sleeve 82 opposite to the solenoid unit portion 80, and a spring 85 is housed between the plug 84 and the spool 83. The spring 85 biases the spool 83 toward the solenoid unit portion 80.

The spool 83 is provided with a first and a second land portions 831, 832 slidably fitted in the first valve hole 820*a*, a third land portion 833 slidably fitted in the second valve hole 820*b*, and a fourth land portion 834 slidably fitted in the third valve hole 820*c*. The first land portion 831 and the second land portion 832 are coupled together via a small diameter portion 835.

An annular groove 821 is formed in the sleeve 82 in association with the small diameter portion 835. An output port 822 that outputs a control pressure is in communication with the annular groove 821. In the sleeve 82, a discharge port 823 and a feeding port 824 are formed so as to be open in association with opposite end faces of the first and second land portions 831, 832.

The second land portion 832 and the third land portion 833 of the spool 83 are provided adjacently to each other. At a boundary portion between the second land portion 832 and the third land portion 833, a first feedback portion 836 is disposed which is a first stepped portion having a predetermined difference in area. The first feedback portion 836 is in communication with a first feedback port 825 formed in the sleeve 82. The first feedback port 825 communicates with the output port 822 via an introduction path that is not depicted in the drawings and that is formed by cutting out an outer periphery of the sleeve 82 such that the control pressure is introduced into the first feedback port 825. The control pressure introduced into the first feedback port 825 acts on the first stepped portion of the first feedback portion 836 to exert a first feedback force $f_1$ on the spool 83 in the direction of an arrow in FIG. 5.

The third land portion 833 and the fourth land portion 834 of the spool 83 are provided adjacently to each other. At a boundary portion between the third land portion 833 and the fourth land portion 834, a second feedback portion 837 is disposed which is a second stepped portion having a predetermined difference in area. The second feedback portion 837 is in communication with a second feedback port 826 formed in the sleeve 82. The second feedback port 826 communicates with the output port 822 via the introduction path that is not depicted in the drawings and that is formed by cutting out the outer periphery of the sleeve 82 such that the control pressure is introduced into the second feedback port 826. The control pressure introduced into the second feedback port 826 acts on the second stepped portion of the second feedback portion 837 to exert a second feedback force $f_2$ on the spool 83 in the same direction as that in which the first feedback force $f_1$ is exerted.

A drain port 827 is also formed in the sleeve 82 at the end of the sleeve 82 where the spring 85 is arranged. While no current is conducted through the solenoid coil 803, communication between the drain port 827 and the second feedback portion 837 is interrupted by the fourth land portion 834. When the control current is supplied to the solenoid coil 803 and the spool 83 is pressed by the shaft 805 fixed to the plunger 804 to move a predetermined distance, the third land portion 833 closes the second feedback port 826. Subsequently, the spool 83 further moves the predetermined distance to enable the communication between the drain port 827 and the second feedback portion 837 interrupted by the fourth land portion 834. Consequently, a drain pressure acts on the second feedback portion 837.

The spool 83 is held at a position where a magnetic force F acting on the plunger 804 is balanced with a resultant force of the first feedback force $f_1$, the second feedback force $f_2$, and a bias force K of the spring 85. When the drain pressure acts on the second feedback portion 837, the second feedback force $f_2$ is lost, and the spool 83 is held at a position where the magnetic force F is balanced with the resultant force of the first feedback force $f_1$ and the bias force K of the spring 85.

The control valve 8 is used with the sleeve 82 fitted in a fitting hole 860 formed in a valve body 86. The valve body 86 is provided with an output passage 861 that communicates with the output port 822, a discharge passage 862 that communicates with the discharge port 823, a feeding passage 863 that communicates with the feeding port 824, and a drain passage 864 that communicates with the drain port 827. The output passage 861 is connected to a pipeline 73$d$, and the feeding passage 863 is connected to a pipeline 73$a$. The discharge passage 862 and the drain passage 864 are connected to the pipeline 73$c$.

Now, operations of the control valve 8 will be described. While no current is conducted through the solenoid coil 803, the control valve 8 is in an initial position where the spool 83 is pressed against the solenoid unit portion 80 by the bias force of the spring 85 and where one end of the shaft 805 is in abutting contact with a bottom surface 801$b$ of the cover 801 (a state illustrated in an upper half of FIG. 5). In this state, the communication between the output port 822 and the feeding port 824 is interrupted by the second land portion 832, and the output port 822 communicates with the discharge port 823. Consequently, the output port 822 is kept at a low pressure.

When the control current supplied to the solenoid coil 803 gradually increases, the plunger 804 receives the magnetic force to allow the shaft 805 to press the spool 83. The spool 83 thus moves away from the solenoid unit portion 80 against the bias force of the spring 85. As a result, the second land portion 832 is displaced to gradually increase a flow channel area between the output port 822 and the feeding port 824, and the first land portion 831 is displaced to gradually reduce a flow channel area between the output port 822 and the discharge port 823. This gradually increases the control pressure output from the output port 822.

At this time, until the communication between the drain port 827 and the second feedback portion 837 is enabled to cause a loss of the second feedback force $f_2$, the spool 83 is positioned such that the magnetic force F acting on the plunger 804 is balanced with the resultant force of the first feedback force $f_1$, the second feedback force $f_2$, and the bias force K of the spring 85. Upon further moving to cause a loss of the second feedback force $f_2$, the spool 83 is positioned such that the magnetic force F acting on the plunger 804 is balanced with the resultant force of the first feedback force $f_1$ and the bias force K of the spring 85.

The control current conducted when the second feedback force $f_2$ is lost corresponds to a current value $I_1$ in a graph illustrated in FIG. 6. The second feedback force $f_2$ acts to prevent the spool 83 from moving from the initial position, and thus, the change ratio of the output hydraulic pressure to the control current is low in the first region where the control current is smaller than the predetermined current value $I_1$, and is high in the second region where the control current is equal to or larger than the predetermined current value $I_1$.

The control apparatus 10 controls the interrupting mechanism 12 and the driving force distribution apparatus 1 to enable transmission of the driving force to the rear wheels 105R, 105L in the four-wheel driving state, while interrupting the transmission of the driving force by the interrupting mechanism 12 and the driving force distribution apparatus 1 in the two-wheel driving state. The control apparatus 10 further increases or reduces the control current supplied to the control valve 8 in the four-wheel driving state, to adjust the driving force transmitted to the rear wheels 105R, 105L through the propeller shaft 108 by the driving force distribution apparatus 1.

At this time, the control apparatus 10 calculates a torque to be transmitted via the friction clutch 53 based on a differential rotation speed that is a difference between the average rotation speed of the front wheels 104R, 104L and the average rotation speed of the rear wheels 105R, 105L and the pedal travel of an accelerator pedal. According to the results of the calculation, the control apparatus 10 increases or reduces the control current in the second region of the current-hydraulic pressure characteristics. The torque transmitted via the friction clutch 53 has a maximum value of, for example, 1000 Nm.

To shift the four-wheel driving state to the two-wheel driving state, the control apparatus 10 sets the control current supplied to the control valve 8 to a current value in the first region that is smaller than the current value $I_1$. In the present embodiment, to shift from the four-wheel driving state to the two-wheel driving state, the control apparatus 10 supplies the valve 8 with a control current with a current value $I_2$ equal to or smaller than the half of the current value $I_1$. Specifically, based on a detection signal from the current sensor 10$a$, PWM control is performed so as to supply a control current with the current value $I_2$ to the control valve 8. Consequently, the hydraulic oil with a pressure $P_2$ corresponding to the current value $I_2$ is fed to the cylinder 221, and the friction clutch 53 allows transmission of a torque in a low torque region. The propeller shaft 108 allows transmission of a small driving force (for example, 10 Nm) corresponding to the torque transmitted via the friction clutch 53.

The control apparatus 10 continuously supplies the control current with the current value $I_2$ to the control valve 8 for a predetermined time (for example, three seconds), and then controls the actuator 12B of the interrupting mechanism 12 to set the interrupting mechanism 12 to an uncoupling state. Subsequently, the control apparatus 10 stops supplying the control current to the control valve 8. Thus, with vibration of the propeller shaft 108 suppressed, the sleeve 123 can be smoothly moved in the axial direction with respect to the first clutch wheel 121 and the second clutch wheel 122 to allow for a shift to the two-wheel driving state.

When an attempt is made to move the sleeve 123 while a strong driving force is being transmitted through the propeller shaft 108, the sleeve 123 fails to be moved due to a friction force exerted between the spline teeth 123$a$ of the sleeve 123 and the spline teeth 121$a$, 122$a$ of the first clutch wheel 121 and the second clutch wheel 122. When the friction clutch 53 is completely disengaged so that no driving force is transmitted through the propeller shaft 108, the propeller shaft 108 may vibrate to generate noise due to gear rattle. In the present embodiment, the actuator 12B of the interrupting mechanism 12 is operated after the control current with the current value $I_2$ is continuously supplied to the control valve 8 for a predetermined time. Consequently, the four-wheel driving state can be shifted to the two-wheel driving state with possible vibration and noise suppressed.

To shift the two-wheel driving state with the propeller shaft 108 stopped to the four-wheel driving state, the control apparatus 10 also sets the control current supplied to the control valve 8 to a current value in the first region that is smaller than the current value $I_1$. In the present embodiment, to shift the two-wheel driving state to the four-wheel driving state, the control apparatus 10 supplies the control current with a current value $I_3$ larger than the current value $I_2$ and smaller than the current value $I_1$. Consequently, a torque is transmitted from the rear wheels 105R, 105L to the propeller shaft 108 via the friction clutch 53 to slowly accelerate the propeller shaft 108 held stationary without causing vibration as a result of rapid acceleration. The first clutch wheel 121 and the second clutch wheel 122 of the interrupting mechanism 12 are rotationally synchronized, and then, the actuator 12B of the interrupting mechanism 12 is controlled to set the interrupting mechanism 12 to the coupling state.

When shifting the two-wheel driving state to the four-wheel driving state or when shifting the four-wheel driving state to the two-wheel driving state, the control apparatus 10 may set the current value of the control current supplied to the control valve 8 larger than the current value $I_1$. In other words, at least either when shifting the two-wheel driving state to the four-wheel driving state or when shifting the four-wheel driving state to the two-wheel driving state, the control apparatus 10 may adjust the control current so as to allow the hydraulic oil with a pressure lower than the predetermined pressure value $P_1$ corresponding to the current value $I_1$ to be fed to the cylinder 221. For example, if the control current with a current value larger than the current value $I_1$ is supplied to the control valve 8 when the two-wheel driving state is switched to the four-wheel driving state, the acceleration of the propeller shaft 108 can be increased to allow quick switching to the four-wheel driving state.

In the present embodiment, the ratio of the amount of change in the feeding pressure applied to the cylinder 221 to the amount of change in the control current supplied to the control valve 8 is lower in the first region than in the second region of the current-hydraulic pressure characteristics. Thus, the torque transmitted via the friction clutch 53 can be precisely controlled particularly in a low torque region. In other words, even with an error in detection of the control current by the current sensor 10a or pulsation of the control current due to PWM control, the corresponding adverse effect is unlikely to be reflected in the torque transmitted via the friction clutch 53. Consequently, the switching between the two-wheel driving state and the four-wheel driving state can be smoothly performed.

Now, a second embodiment of the invention will be described. The present embodiment is different from the first embodiment in that the control valve 8 of the hydraulic unit 7 described in the first embodiment with reference to FIGS. 4 to 6 is a flow control valve with no feedback function and that the current-hydraulic pressure characteristics of the control valve 8 that is a flow control valve do not exhibit two-stage changes but are such that, given a constant input hydraulic pressure, the output hydraulic pressure is proportional to the supplied control current and that the electric motor 71 enables controllable variation of the rotation speed of the hydraulic pump 72, that is, variation of the discharge pressure of the hydraulic pump 72.

In the second embodiment, the control apparatus 10 reduces a motor current supplied to the electric motor 71 at the time of the switching between the two-wheel driving state and the four-wheel driving state to decrease the discharge pressure of the hydraulic pump 72. In the description of the present embodiment, the control apparatus 10 performs two-stage switching on the motor current supplied to the electric motor 71 according to the hydraulic pressure of the hydraulic oil to be fed to the cylinder 221. However, the invention is not limited to this. The motor current supplied to the electric motor 71 may exhibit three-or-more-stage changes or stepless changes.

FIG. 7 is a graph illustrating the current-hydraulic pressure characteristics of the control valve 8 according to the second embodiment. In FIG. 7, the characteristics exhibited when a high motor current is supplied to the electric motor 71 are indicated by a continuous line, and the characteristics exhibited when a low motor current is supplied to the electric motor 71 are indicated by a dashed line. The control apparatus 10 provides the high motor current when the hydraulic pressure of the hydraulic oil to be fed to the cylinder 221 is equal to or higher than the predetermined value $P_1$, and provides the low motor current when the hydraulic pressure of the hydraulic oil to be fed to the cylinder 221 is lower than the predetermined value $P_1$.

The control apparatus 10 supplies the control current to the control valve 8 based on the current-hydraulic pressure characteristics indicated by a continuous line in FIG. 7 when the hydraulic pressure of the hydraulic oil to be fed to the cylinder 221 is equal to or higher than the predetermined value $P_1$, and supplies the control current to the control valve 8 based on the current-hydraulic pressure characteristics indicated by a dashed line in FIG. 7 when the hydraulic pressure of the hydraulic oil to be fed to the cylinder 221 is lower than the predetermined value $P_1$.

Consequently, the ratio of the amount of change in the feeding pressure applied to the cylinder 221 to the amount of change in control current is lower when the pressure of the hydraulic oil fed to the cylinder 221 is lower than the predetermined value $P_1$ than when the pressure of the hydraulic oil fed to the cylinder 221 is equal to or higher than the predetermined value $P_1$. Therefore, as is the case with the first embodiment, the torque transmitted via the friction clutch 53 can be precisely controlled particularly in a low torque region.

Now, a third embodiment will be described with reference to FIG. 8 and FIG. 9.

Figure 8:
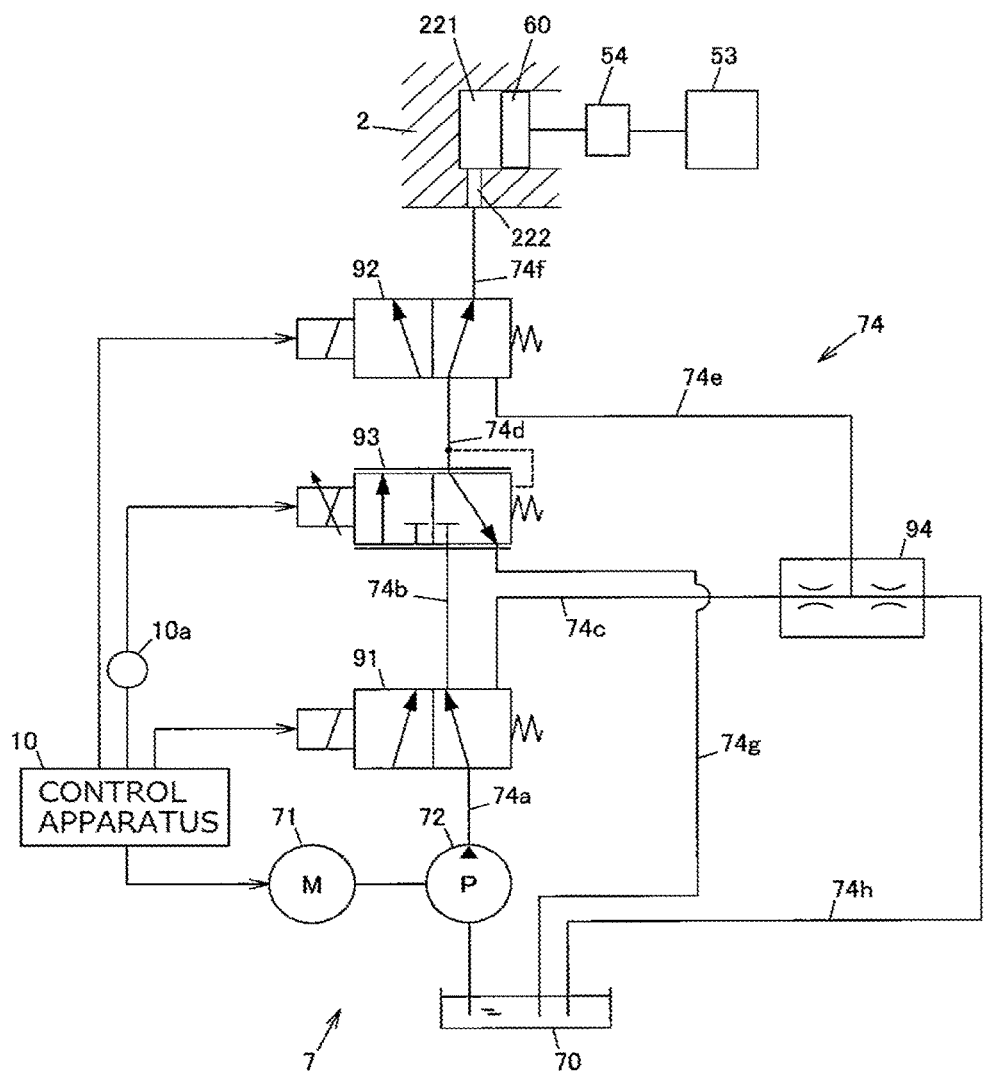
FIG. 8 is a schematic diagram depicting a configuration example of a hydraulic unit according to a third embodiment.

FIG. 8 is a schematic diagram depicting a configuration example of the hydraulic unit 7 according to the third embodiment. The hydraulic unit 7 according to the present embodiment includes the reservoir 70, the electric motor 71 to which a current is supplied by the control apparatus 10, the hydraulic pump 72, and a hydraulic circuit 74.

The hydraulic circuit 74 has a first and a second selector valves 91, 92, a control valve 93, a fixed-restrictor valve 94, a pipeline 74a extending from the hydraulic pump 72 to the first selector valve 91, a pipeline 74b extending from the first selector valve 91 to the control valve 93, a pipeline 74c extending from the first selector valve 91 to the fixed-restrictor valve 94, a pipeline 74d extending from the control valve 93 to the second selector valve 92, a pipeline 74e extending from the fixed-restrictor valve 94 to the second selector valve 92, a pipeline 74f extending from the second selector valve 92 to the hydraulic oil feeding hole 222 in the housing 2, a pipeline 74g extending from the control valve 93 to the reservoir 70, and a pipeline 74h extending from the fixed-restrictor valve 94 to the reservoir 70.

The first selector valve 91 enables switching between a first connection state where the pipeline 74b is connected to the pipeline 74a and a second connection state where the pipeline 74c is connected to the pipeline 74a. The second selector valve 92 enables switching between a first connection state where the pipeline 74d is connected to the pipeline 74f and a second connection state where the pipeline 74e is connected to the pipeline 74f. The first and second selector valves 91, 92 are in the first connection state while being supplied with no current by the control apparatus 10, and are set to the second connection state when being supplied with a current by the control apparatus 10.

The control valve 93 is configured similarly to the control valve 8 according to the first embodiment except that the control valve 93 has no configuration in which the feedback force of the feedback port exhibits two-stage changes. The control valve 93 reduces the pressure of the hydraulic oil discharged from the hydraulic pump 72 down to the control pressure corresponding to the control current supplied by the control apparatus 10, to output the resultant pressure to the pipeline 74d. A drain port and a discharge port of the control valve 93 are in communication with the pipeline 74g. The control valve 93 can output a control pressure of, for example, 0 to 4 MPa according to the control current. The fixed-restrictor valve 94 outputs hydraulic oil with a pressure with a fixed value (for example, 0.3 MPa) to the pipeline 74e, and discharges excess hydraulic oil to the pipeline 74h.

In the four-wheel driving state, the control apparatus 10 supplies no current to the first and second selector valves 91, 92 to keep the first and second selector valves 91, 92 in the first connection stage, and supplies the control current to the control valve 93 according to a traveling state of the four-wheel drive vehicle 100. To the rear wheels 105R, 105L, a driving force is transmitted which corresponds to the hydraulic pressure of the hydraulic oil supplied to the cylinder 221 via the control valve 93 and the second selector valve 92.

At least either when switching from the two-wheel driving state to the four-wheel driving state or when switching from the four-wheel driving state to the two-wheel driving state, the control apparatus 10 supplies a current to the first and second selector valves 91, 92 to set the first and second selector valves 91, 92 to the second connection state. Consequently, the hydraulic oil output from the fixed-restrictor valve 94 is supplied to the cylinder 221. At this time, the control valve 93 is disconnected from a channel for the hydraulic oil to the cylinder 221 between the first selector valve 91 and the second selector valve 92, and the control apparatus 10 stops supplying the control current to the control valve 93. The pressure of the hydraulic oil output from the fixed-restrictor valve 94 is suitable for accelerating the propeller shaft 108 held stationary by the torque transmitted from the rear wheels 105R, 105L via the friction clutch 53, without causing vibration as a result of rapid acceleration.

Figure 9:
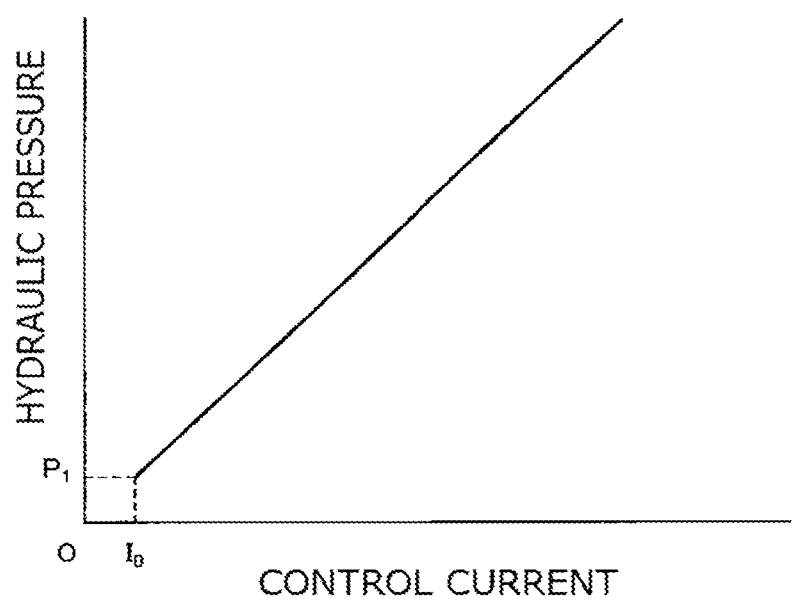
FIG. 9 is a graph illustrating the current-hydraulic pressure characteristics indicative of the relation between the control current supplied to the control valve and a hydraulic pressure applied to a cylinder according to a third embodiment.

FIG. 9 is a graph illustrating the current-hydraulic oil characteristics indicative of the relation between the control current supplied to the control valve 93 and the hydraulic pressure applied to the cylinder 221. When the feeding pressure applied to the cylinder 221 and corresponding to the driving force to be transmitted to the rear wheels 105R, 105L is equal to or higher than the predetermined value $P_1$, the control apparatus 10 keeps the first and second selector valves 91, 92 in the first connection state to supply the control current with a current value $I_0$ or larger to the control valve 93. When the feeding pressure applied to the cylinder 221 and corresponding to the driving force to be transmitted to the rear wheels 105R, 105L is lower than the predetermined value $P_1$, the control apparatus 10 keeps the first and second selector valves 91, 92 in the second connection state, and supplies no current to the control valve 93.

As described above, also in the present embodiment, the ratio of the amount of change in the feeding pressure applied to the cylinder 221 to the amount of change in control current is lower when the pressure of the hydraulic oil fed to the cylinder 221 is lower than the predetermined value $P_1$ than when the pressure of the hydraulic oil fed to the cylinder 221 is equal to or higher than the predetermined value $P_1$. In the present embodiment, the feeding pressure applied to the cylinder 221 has a constant value corresponding to the opening of the fixed-restrictor valve 94 when the pressure of the hydraulic oil fed to the cylinder 221 is equal to or higher than the predetermined value $P_1$. Thus, as is the case with the first embodiment, the torque transmitted via the friction clutch 53 can be precisely controlled particularly in a low torque region.

Now, a fourth embodiment will be described below with reference to FIG. 10 and FIG. 11.

Figure 10:
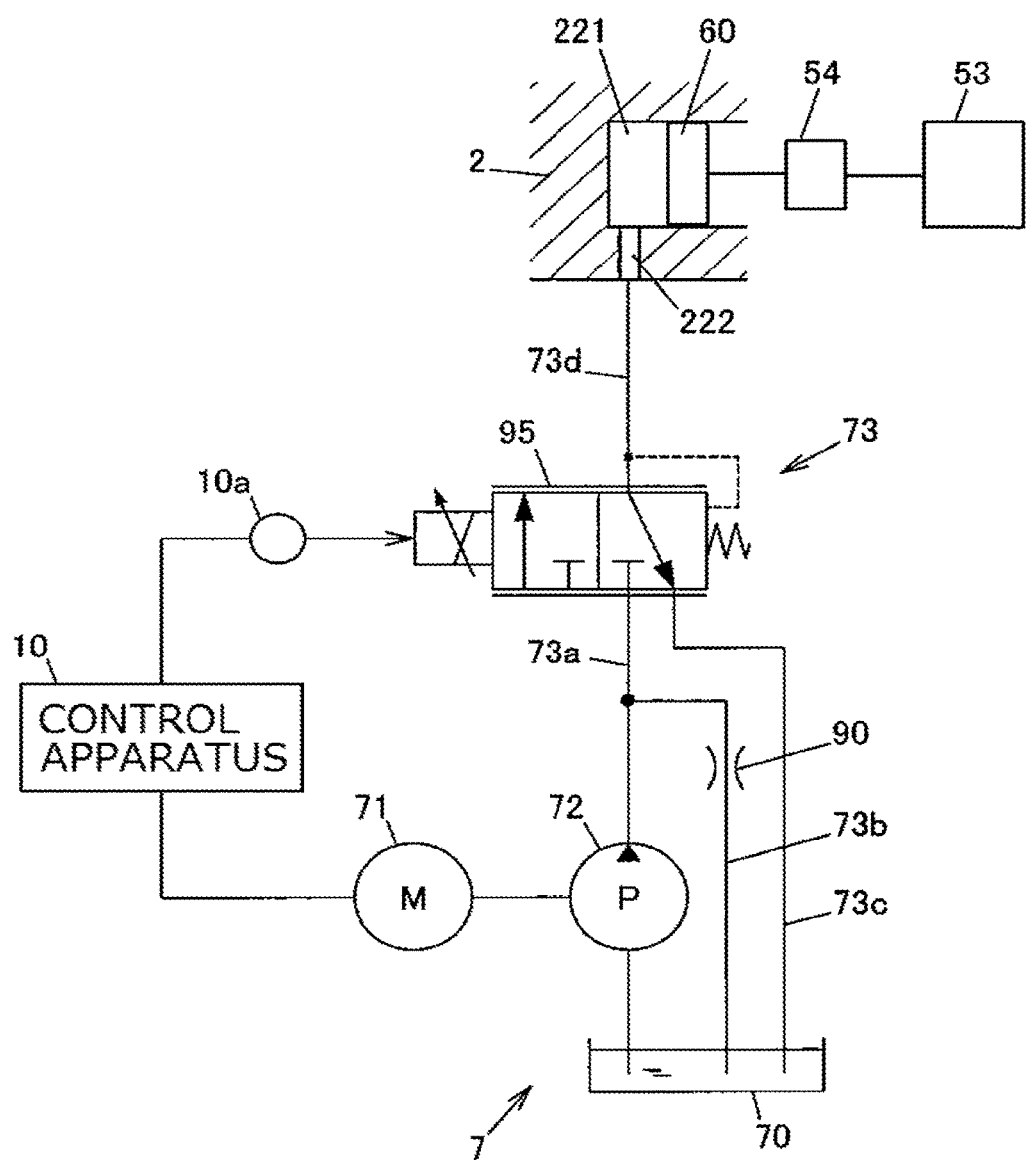
FIG. 10 is a schematic diagram depicting a configuration example of a hydraulic unit according to a fourth embodiment.

FIG. 10 is a schematic diagram depicting a configuration example of the hydraulic unit 7 according to the fourth embodiment. In the hydraulic unit 7 according to the present embodiment, the control valve 8 of the hydraulic unit 7 described in the first embodiment with reference to FIG. 4 is replaced with a control valve 95 that outputs a slight hydraulic pressure even when no control current is supplied to the control valve 95. Components in FIG. 10 that are the same as the corresponding components described in the first embodiment with reference to FIG. 4 are denoted by the same reference numerals and will not be described below. FIG. 11 is a graph illustrating current-hydraulic pressure characteristics indicative of a relation between the control current supplied to the control valve 95 and the hydraulic pressure output from the control valve 95.

As depicted in FIG. 10, the control valve 95 reduces the pressure of the hydraulic oil discharged from the hydraulic pump 72 down to a control pressure corresponding to the control current supplied by the control apparatus 10, to output the resultant pressure to the pipeline 73d. The hydraulic oil with a given pressure corresponding to the opening of the fixed restrictor 90 is fed to the control valve 95.

Figure 11:
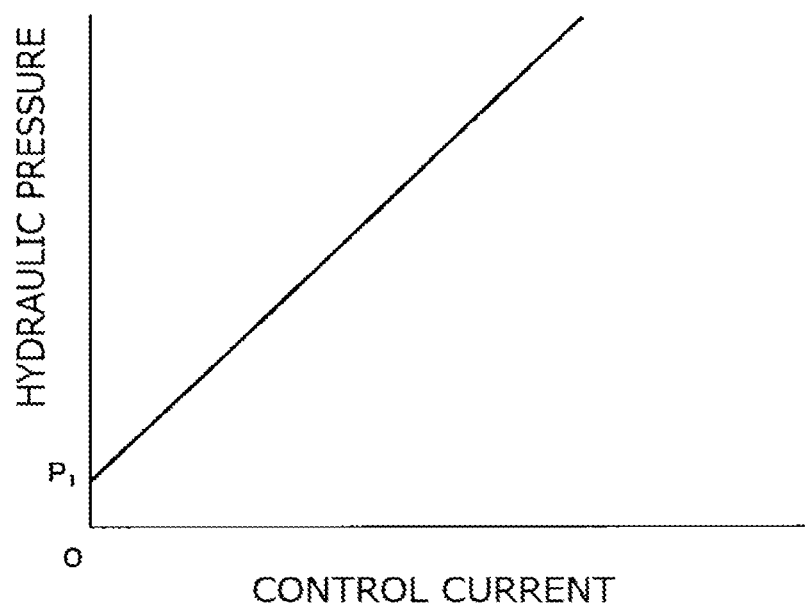
FIG. 11 is a graph illustrating the current-hydraulic pressure characteristics indicative of the relation between the control current supplied to the control valve and the hydraulic pressure output from the control valve according to a fourth embodiment.

As depicted in FIG. 11, when no control current is supplied by the control apparatus 10, the control valve 95 outputs the hydraulic oil with the pressure $P_1$ to the pipeline 73d. As the control current increases from zero, the control valve 95 outputs the hydraulic oil with a pressure $P_1$ plus a pressure proportional to the control current.

The control valve 95 with such characteristics can be obtained by, for example, providing a channel with a small sectional area corresponding to the pressure $P_1$ between the feeding port and the output port. The channel for the hydraulic oil may be provided in the spool or in the sleeve. The spool may be initially positioned to be slightly open so that a slight hydraulic pressure is output even when the spool is in the initial position. In other words, the control valve 95 is provided with a channel configured to output the hydraulic oil with a pressure suitable for accelerating the propeller shaft 108 held stationary by the torque transmitted from the rear wheels 105R, 105L via the friction clutch 53, without causing vibration as a result of rapid acceleration.

The control apparatus 10 supplies no control current to the control valve 95 when the feeding pressure applied to the cylinder 221 and corresponding to the driving force to be transmitted to the rear wheels 105R, 105L is lower than the predetermined value $P_1$. The current value of the control current supplied to the control valve 95 is detected by the current sensor 10a, and a resultant detection signal is fed back to the control apparatus 10. When the feeding pressure applied to the cylinder 221 and corresponding to the driving force to be transmitted to the rear wheels 105R, 105L is equal to or higher than the predetermined value $P_1$, the control apparatus 10 outputs the control current corresponding to the feeding pressure to the control valve 95 based on PWM control.

In the present embodiment, when the feeding pressure applied to the cylinder 221 and corresponding to the driving force to be transmitted to the rear wheels 105R, 105L is lower than the predetermined value $P_1$, the cylinder 221 can be fed with the hydraulic oil with a pressure suitable for accelerating the propeller shaft 108 held stationary without causing vibration as a result of rapid acceleration. Consequently, as is the case with the third embodiment, a shift from the two-wheel driving state to the four-wheel driving state can be smoothly achieved with no adverse effect of an error in detection of the control current by the current sensor 10a or pulsation of the control current due to PWM control. A shift from the four-wheel driving state to the two-wheel driving state can be similarly smoothly achieved.

Now, a fifth embodiment will be described with reference to FIG. 12.

Figure 12:
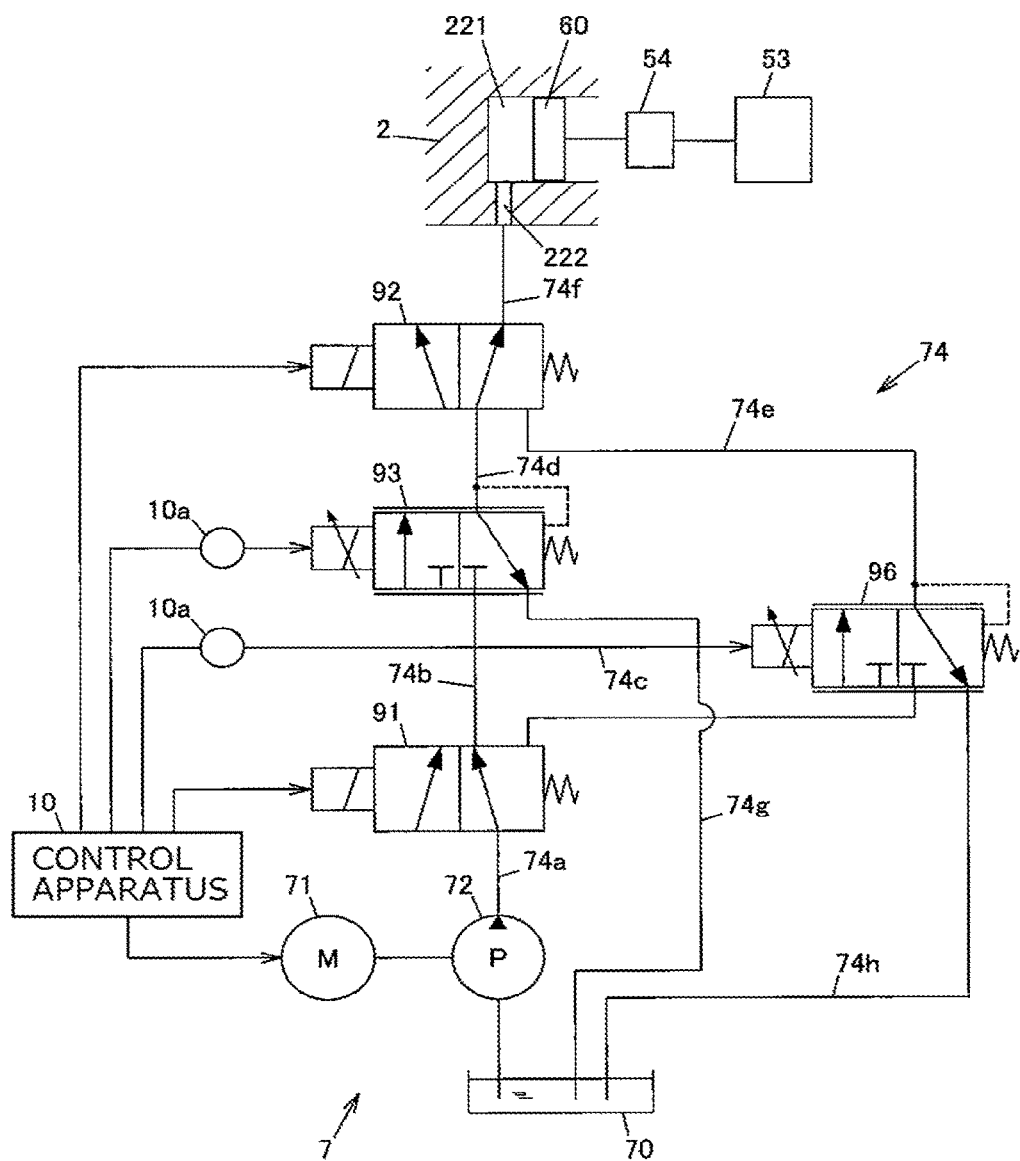
FIG. 12 is a schematic diagram depicting a configuration example of a hydraulic unit according to a fifth embodiment.

FIG. 12 is a schematic diagram depicting a configuration example of the hydraulic unit 7 according to the fifth embodiment. In the hydraulic unit 7 in the present embodiment, the fixed-restrictor valve 94 in the hydraulic circuit 74 described in the third embodiment with reference to FIG. 8 is replaced with a control valve 96 that outputs a control pressure corresponding to the control current. The control valve 93 depicted in FIG. 10 is hereinafter referred to as the first control valve 93, and the control valve 96 is hereinafter referred to as the second control valve 96.

The second control valve 96 has a lower change ratio of the control pressure to the control current than the first control valve 93. Thus, for the control pressure that can be output from the control valve, the second control valve 96 has a smaller maximum value than the first control valve 93. Therefore, even if the control current is varied by an error in detection of the control current by the current sensor 10a or the like, the corresponding adverse effect is less likely to be reflected in the control pressure in the second control valve 96.

As is the case with the third embodiment, the control apparatus 10 supplies no current to the first and second selector valves 91, 92 to keep the first and second selector valves 91, 92 in the first connection state, and supplies the control current to the first control valve 93 according to the traveling state of the four-wheel drive vehicle 100.

At least either when switching from the two-wheel driving state to the four-wheel driving state or when switching from the four-wheel driving state to the two-wheel driving state, the control apparatus 10 supplies a current to the first and second selector valves 91, 92 to keep the first and second selector valves 91, 92 in the second connection state. The control apparatus 10 further supplies the control current to the second control valve 96. As described above, since the second control valve 96 has a lower change ratio of the control pressure to the control current than the first control valve 93, the torque transmitted via the friction clutch 53 can be precisely controlled particularly in a low torque region, as is the case with the first embodiment.

At the time of switching between the two-wheel driving state and the four-wheel driving state, the control apparatus 10 may supply a constant control current to the second control valve 96 or vary the control current supplied to the second control valve 96. If the control current supplied to the second control valve 96 is varied, the control current is desirably gradually increased when the two-wheel driving state is switched to the four-wheel driving state. The control current is desirably gradually reduced when the four-wheel driving state is switched to the two-wheel driving state.

The invention has been described based on the first to fifth embodiments. However, the invention is not limited to the embodiments. The configuration of the four-wheel drive vehicle 100 is not limited to the configuration illustrated in FIG. 1. For example, the rear wheels may be main driving wheels, and the front wheels may be auxiliary driving wheels.

What is claimed is:

1. A four-wheel drive vehicle that enables switching between a two-wheel driving state and a four-wheel driving state, the four-wheel drive vehicle comprising:
   a driving source that generates a driving force;
   main driving wheels to which the driving force is transmitted in the two-wheel driving state and in the four-wheel driving state;
   auxiliary driving wheels to which the driving force is transmitted in the four-wheel driving state;
   a driving shaft through which the driving force is transmitted to the auxiliary driving wheels;
   an interrupting mechanism that enables interruption of transmission of the driving force from the driving source to the driving shaft;
   a driving force distribution apparatus that distributes the driving force transmitted through the driving shaft between the auxiliary driving wheels; and
   a control apparatus that controls the interrupting mechanism and the driving force distribution apparatus to enable the driving force to be transmitted to the auxiliary driving wheels in the four-wheel driving state and to interrupt transmission of the driving force by the interrupting mechanism and the driving force distribution apparatus, wherein
   the driving force distribution apparatus includes:
      a friction clutch having a first friction disc that rotates along with an output rotating member on an auxiliary driving wheel side and a second friction disc that rotates along with an input rotating member on an driving shaft side;
      a piston that receives a hydraulic pressure of hydraulic oil fed to a cylinder to press the friction clutch;
      a hydraulic pump that discharges the hydraulic oil; and
      a hydraulic circuit including a control valve that reduces the pressure of the hydraulic oil discharged from the hydraulic pump down to a control pressure corresponding to a control current to output a resultant pressure, the hydraulic circuit feeding the hydraulic oil with the reduced pressure to the cylinder,
   in the hydraulic circuit, a change ratio is a ratio of an amount of change in a feeding pressure applied to the cylinder to an amount of change in the control current,
   the change ratio is lower when the pressure of the hydraulic oil fed to the cylinder is lower than a predetermined pressure value than the change ratio when the pressure of the hydraulic oil fed to the cylinder is equal to or higher than the predetermined pressure value, and the control apparatus adjusts the control current so as to feed the hydraulic oil with a pressure lower than the predetermined pressure value to the cylinder at least either when switching from the two-wheel driving state to the four-wheel driving state or when switching from the four-wheel driving state to the two-wheel driving state.

2. The four-wheel drive vehicle according to claim 1, wherein
the control valve has a characteristic that the change ratio of the control pressure to the control current obtained when the control current is smaller than a predetermined current value is lower than the change ratio of the control pressure to the control current obtained when the control current is equal to or larger than the predetermined current value.

3. The four-wheel drive vehicle according to claim 1, wherein
the hydraulic circuit has a fixed-restrictor valve that outputs the hydraulic oil with a constant pressure, and
at least either when switching from the two-wheel driving state to the four-wheel driving state or when switching from the four-wheel driving state to the two-wheel driving state, the control apparatus controls the hydraulic circuit so as to feed the hydraulic oil output from the fixed-restrictor valve to the cylinder.

4. The four-wheel drive vehicle according to claim 1, wherein
the hydraulic circuit includes first and second selector valves that reduce the pressure of the hydraulic oil discharged from the hydraulic pump down to the control pressure corresponding to the control current to output a resultant pressure,
the second selector valve has a lower change ratio of the control pressure to the control current than the change ratio of the first selector valve, and
at least either when switching from the two-wheel driving state to the four-wheel driving state or when switching from the four-wheel driving state to the two-wheel driving state, the control apparatus controls the hydraulic circuit so as to feed the hydraulic oil output from the second selector valve to the cylinder.

5. The four-wheel drive vehicle according to claim 1, wherein
at least either when switching from the two-wheel driving state to the four-wheel driving state or when switching from the four-wheel driving state to the two-wheel driving state, the control apparatus reduces a current supplied to an electric motor that drives the hydraulic pump.

* * * * *